United States Patent [19]

Eidsmore

[11] Patent Number: 4,792,113
[45] Date of Patent: * Dec. 20, 1988

[54] FLUID FLOW CONTROL VALVE

[75] Inventor: Paul G. Eidsmore, Scotts Valley, Calif.

[73] Assignee: Integrated Flow Systems, Inc., Scotts Valley, Calif.

[*] Notice: The portion of the term of this patent subsequent to Nov. 25, 2003 has been disclaimed.

[21] Appl. No.: 933,780

[22] Filed: Nov. 24, 1986

Related U.S. Application Data

[63] Continuation-in-part of Ser. No. 675,825, Nov. 28, 1984, Pat. No. 4,624,443, which is a continuation-in-part of Ser. No. 398,845, Jul. 16, 1982, abandoned.

[51] Int. Cl.⁴ .............................................. F16K 31/08
[52] U.S. Cl. ...................................... 251/65; 137/582; 137/519; 137/460
[58] Field of Search ................... 137/460, 519, 522; 251/65

[56] References Cited

U.S. PATENT DOCUMENTS

| | | | |
|---|---|---|---|
| 3,326,233 | 6/1967 | Perruzzi | 137/460 |
| 3,877,478 | 4/1975 | Lougworth | 251/65 X |
| 4,178,958 | 12/1979 | Palav | 137/460 |
| 4,223,692 | 9/1980 | Perry | 137/460 X |
| 4,548,047 | 10/1985 | Hayaski | 251/65 X |

FOREIGN PATENT DOCUMENTS

2249598 5/1973 Fed. Rep. of Germany ...... 137/460

Primary Examiner—Arnold Rosenthal
Attorney, Agent, or Firm—Fay, Sharpe, Bealle, Fagan, Minnich & McKee

[57] ABSTRACT

A flow limit valve for limiting the flow rate of a pressurized fluid includes a valve body with an interconnecting cavity of circular cross section. Within the cavity is a piston that slides within the cavity under force generated by a pressure differential across the piston to a closed position in engagement with a seat at the end of the cavity. A first encapsulated magnet is carried within the valve body in a chamber located on the side of the seat opposite the cavity. The first encapsulated magnet can be moved in response to another magnet outside the valve body to move a pin which can extend through the seat when the piston is in a closed position to thereby move the piston to an open position. The magnetic forces applied through the valve body affect internal valve operation via the pin and thus avoids the dange of noxious fluids escaping through sliding seals or flexible membranes.

3 Claims, 5 Drawing Sheets

FLUID FLOW CONTROL VALVE

CROSS-REFERENCE TO RELATED APPLICATION

This application is a continuation-in-part of copending application Ser. No. 675,825, filed Nov. 28, 1984 and issued as U.S. Pat. No. 4,624,443, dated Nov. 25, 1986 which is a continuation-in-part of application Ser. No. 398,845, filed July 16, 1982, now abandoned.

BACKGROUND OF THE INVENTION

The present invention relates broadly to valves for controlling the flow of pressurized fluids and more specifically to flow limit valves that close when the flow rate exceeds a limiting value.

DESCRIPTION OF THE PRIOR ART

Flow limit valves are commonly used as safety devices in pressurized fluid distribution systems to isolate fluid sources from any ruptures or breaches to minimize the loss of pressurized fluids. Properly designed systems using pressurized gases or liquids that are toxic, corrosive, or explosive employ flow limit valves to minimize exposure to these hazardous chemicals in accident situations. Water distribution systems often utilize flow limit valves to prevent excessive water loss due to pipe breakage.

Functionally, a flow limit valve permits fluid flow up to a predetermined limiting flow rate. The flow rate through a device is proportional to the difference between the upstream supply pressure and the downstream outlet pressure. During normal operation, the pressure differential across the valve establishes a flow rate through the valve that is less than or equal to the limiting flow rate. A rupture in the downstream distribution system causes a reduction in the downstream pressure and, hence, an increase in the pressure differential across the valve. This increased pressure differential corresponds to a flow rate through the valve which may exceed the limiting flow rate. To limit the flow rate through the flow limit valve to the predetermined limit, a piston, or similar device, is provided which blocks the flow path when the pressure differential exceeds that which corresponds to the limiting flow rate. All flow through the valve is blocked until the pressure differential is lowered by repairing the rupture and the piston is reset to its original position.

A typical flow limit valve in the prior art includes a primary flow path through an orifice from an inlet port to an outlet port. A movable piston is provided to close the primary flow path when the pressure differential across the orifice exceeds a certain value. Fluid from the inlet and outlet sides of the orifice is ported to opposite sides of the piston. The outlet pressure, assisted by a spring, tends to move the piston to an open position, which permits fluid flow through the valve, and the inlet pressure tends to move the piston to a closed position, which prevents fluid flow. The spring and the piston are designed such that any pressure differential greater than the pressure differential that corresponds to the limiting flow rate allows the inlet pressure to overcome the outlet pressure and the spring force to move the piston to the closed position. To reset this flow limit value, a bypass valve is opened and fluid flows through a secondary flow path to equalize the pressure on each side of the piston thereby allowing the spring to move the piston to the open position. Certain known valves use a third flow path with an integrated valve to bypass the shut-off piston for providing adjustment of the flow limit. Flow limit valves of these types are expensive to manufacture and difficult to purge due to the multiple flow paths and bypass valves involved. Also, the flow rate through a flow limit valve should be proportional to the pressure differential up to the limiting value of the flow rate and should sharply fall to zero when the limiting value is exceeded. However, spring-biased flow limit valves allow a flow rate that is proportional to the pressure differential up to the point where the piston begins to compress the spring and move from the open position to the closed position, but do not provide a sharp closure because of the additional pressure differential necessary to further compress the spring and complete the movement of the piston from the open position to the closed position.

Further, known valves for controlling the flow of toxic or corrosive fluids and gases commonly rely upon flexible members or sliding seals to control operation or reset of the valve from the environment. However, such schemes are generally unsatisfactory because of the danger that the environment may become contaminated by the noxious fluid flowing through the valve if the flexible member or sliding seal fails under fluid pressure. In addition, a flexible member such as a bellows-type or diaphragm-type device or sliding seal commonly introduce anomalous "pockets" or chambers along the passages for fluids which are difficult to purge of residual fluid when the fluid system has to be cleaned, or a new fluid which must not be contaminated by residual fluid is to be introduced.

What is needed, therefore, is a flow limit valve that is low cost and that provides for a sharp valve closure at a limiting flow rate. What is additionally needed is a flow limit valve that is convenient to reset to an open position and that may be adjusted to different limiting flow rates. Also, such a valve should have minimal "pockets" for easy purging and should obviate the dangers of leaking noxious fluids into the environment through sliding seals.

SUMMARY OF THE INVENTION

An object of this invention is to provide a flow limit valve which permits fluid flow at flow rates below a limiting value and which prevents fluid flow after the limiting value has been exceeded until the valve is reset.

Another object of this invention is to provide a flow limit valve that is easily resettable from a closed position which prevents fluid flow to an open position which permits fluid flow.

Another object of this invention is to provide a flow limit valve with a limiting flow rate that is easily resettable and adjustable without relying upon bellows or diaphragms or sliding seals.

Still another objective of this invention is to provide a valve without multiple passageways that are difficult to purge.

These and other objects, which will hereinafter become apparent, are accomplished in accordance with one embodiment of this invention by providing a flow limit valve for limiting the flow rate for a pressurized fluid therethrough. This valve includes a valve body with threaded or welded glands at the inlet and outlet ports and an interconnecting cavity of circular cross section. Within the cavity is a piston with passageways that determine the limiting flow rate of the valve and that establish a pressure differential across the piston as a result of fluid flow therethrough. The flow path of fluid through the valve is from the inlet port to the inlet side of the cavity, along sides of the piston into the outlet side of the cavity and then to the outlet port. If the force generated by the pressure differential across the piston exceeds the force necessary to lift the mass or weight of the piston, then the piston slides within the cavity to a closed position which prevents fluid flow through the valve. An integral elastomeric pad on the piston forms a seal to shut off the flow path when the piston is at the closed position. A pin is provided that is attached to the piston and that protrudes through the piston seat into the outlet side of the cavity when the piston is at the closed position. In one embodiment, an encapsulated magnet is disposed to contact the pin and move the pin and the attached piston to the open position.

In accordance with another embodiment of the present invention, improved method and means are provided for valving noxious fluids which include magnetic actuators that coact through an improved design of solid valve body to assure integrity against leaks and permit substantially complete purging of residual fluids. Various other embodiments of the present invention operate as excess-flow controllers, remote control on-off valves, and the like.

An advantage of the present invention is the sharp transition from a flowing to a blocking state.

A further advantage of the present invention is the ease of resetting the valve from the blocking to the flowing state without relying upon the integrity of bellows or diaphragms or sliding seals.

Still another advantage of the present invention is the ease of changing the flow rate limit by changing the internal piston with its associated parameters of weight and cross section of fluid passageways.

DESCRIPTION OF THE DRAWINGS

FIG. 1 is a sectional view of a flow limit valve, according to the present invention, for limiting the flow rate of a pressurized fluid and is shown in an open, or flowing, position;

DESCRIPTION OF THE PREFERRED AND ALTERNATE EMBODIMENTS

Figures 1, 9:
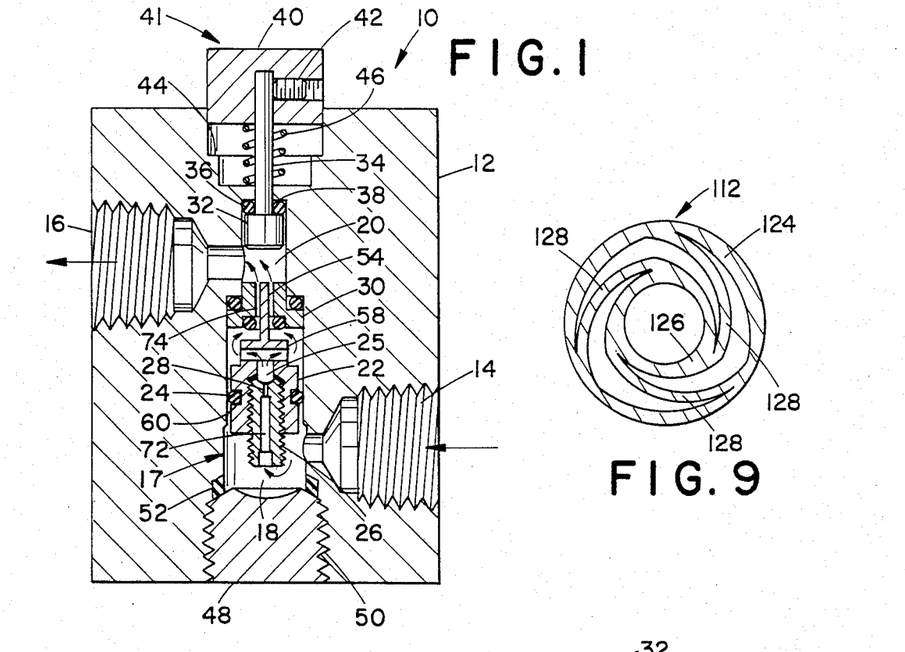
Figure 2:
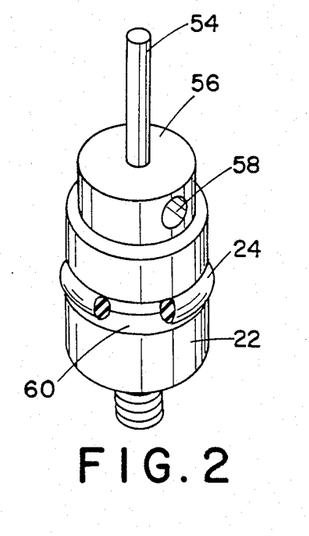
FIG. 2 is an isometric view of a piston utilized in the flow limit valve of FIG. 1.

Referring to FIG. 1, there is shown a flow limit valve according to one embodiment of the present invention which limits the flow of a pressurized fluid to a selected limit. Specifically, a flow limit valve 10 includes a valve body 12 having a threaded inlet port 14 for connection to a source of pressurized fluid, a threaded outlet port 16 for connection to a fluid distribution system, and a cavity 17 of circular cross section which connects the two ports 14 and 16. A piston 22 is positioned within the cavity 17 and divides the cavity into an inlet side 18 and an outlet side 20. A piston seal 24, which may be an O-ring, is installed in a piston seal groove 60 and prevents any fluid from flowing between the piston 22 and the wall of the cavity 17. FIG. 2 additionally shows features of the piston 22 such as a piston pin 54, a flow seal seat 56, and cross flow passage 58 which is a radial hole connecting to an axial chamber 25 within the piston.

FIG. 1 shows the piston 22 in an open positon which permits fluid to flow on a path through the valve 10, as indicated by arrows, from the inlet port 14, into the inlet side of the cavity 18, through an axial passage 72 of an orifice screw 26, across an orifice 28, into the axial chamber 25 of the piston, through the cross flow passage 58 in the piston, around the piston pin 54 and through a piston seat passage 74, into the outlet side of the chamber 20 and, finally, through the outlet port 16. As the fluid flows across the orifice 28, which is the most resticted portion of the flow path, the pressure of the fluid decreases, thereby establishing a pressure differential across the piston.

The pressure upstream of the orifice 28 is greater than the pressure downstream of the orifice, hence the pressure differential generates a force that tends to move the piston 22 toward a piston seat 30. Opposing the movement of the piston 22 is a friction force between the piston seal 24 and the wall of the cavity 17. The pressure differential across the orifice is proportional to the amount of flow therethrough, thus an increased flow increases the magnitude of the pressure differential. The diameter of the orifice 28 is sized such that the pressure differential across it at the limiting flow rate generates a force on the piston 22 that equals the static friction force between the piston seal 24 and the wall of the cavity 17. At any flow rate exceeding the limiting value, the pressure force on the piston 22 will overcome the static friction force and will move the piston against the piston seat 30, thereby blocking flow. Since dynamic, or sliding friction is less than static friction, once the piston 22 begins to move, it will not stop until it contacts the piston seat 30.

Figure 3:
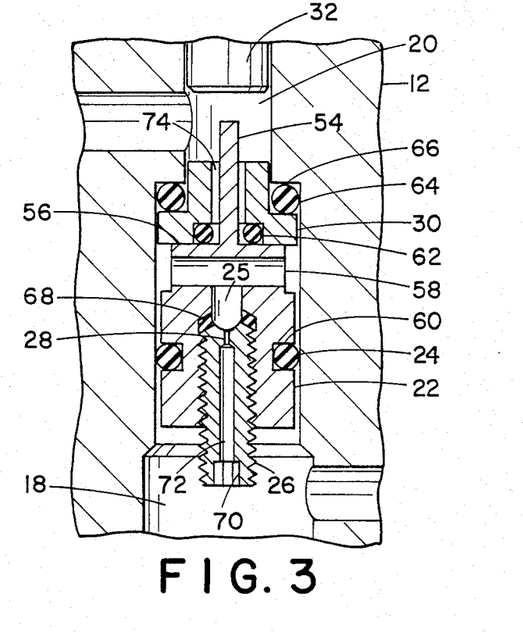
FIG. 3 is an enlarged sectional view of a portion of the flow limit valve of FIG. 1 and is shown in a closed, or blocking, position.

FIG. 3 shows the piston 22 in a closed, or blocking, position and also shows that the flow seal seat 56 of the piston contacts a flow seal 62 to block fluid flow to the piston seat passage 74. A piston seat seal 64 seals against a shoulder 66 in the valve body 12 to prevent any flow around the piston seat 30.

Once the piston 22 has shifted to the closed position, it remains there until it is manually reset to the open position. When the piston 22 is in the closed position, the end of the piston pin 54 protrudes through the piston seat 30 as show in FIG. 3. A reset mechanism 41 is shown in FIG. 1 and includes a pushrod head 32, located within the outlet side of the cavity 20, that is attached to a pushrod 34 which passes through the wall of the valve body 12 and is sealed by a pushrod seal 36 positioned by a shoulder 38 in the valve body. A push button 40 is attached to the end of the pushrod by a set screw 42. In operation, the push button 40 is pressed, causing the pushrod head 32 to contact and move the protruding end of the piston pin 54 to a position flush with the piston seat 30. This moves the piston 22 to the open position and thereby allows the fluid to again flow through the valve 10. A push button stop 44 is provided to limit the inward travel of the reset mechanism 41, and a compression spring 46 automatically returns the mechanism to its original position.

The magnitude of the limiting flow rate, above which the flow limit valve 10 shifts to a closed position, is determined by properties of the fluid such as density and viscosity and by the size of the orifice 28. To change the magnitude of the limiting flow rate, the orifice screw 26 must be changed. An end plug 48, normally seated in a plug port 50 and sealed by a seal 52, can be removed for access to the piston 22, see FIG. 1. Once the end plug 48 is removed, the piston 22 may be removed using long-nose pliers. To remove the orifice screw 26, a dowel pin having a diameter slightly smaller than the diameter of the cross flow passage 58 is inserted into a hex socket 70 at the end of the orifice screw which is thereupon backed out of its mounting hole. Another orifice screw 26, having an orifice 28 corresponding to the desired limiting flow rate, is then threaded into the mounting hole until it seats against a seal 68. Reinstallation is then simply a matter of inserting the piston 22 into the cavity 17 while pressing the push button 40 to provide positioning of the piston at the open position and then replacing the end plug 48.

An alternative embodiment of the present invertion is exactly as described above with the exception that the compression spring 46 is not used. When pressure exists in the outlet side of the cavity 20, it will move the reset mechanism 41 to the position shown in FIG. 1. Therefore, if the push button 40 is pressed and does not return, then there is atmospheric pressure in the outlet side of the cavity 20, while if the push button is pressed and does return, there is pressure in said cavity. This provides a handy indication of pressure in the outlet side of the valve 10.

Figure 4:
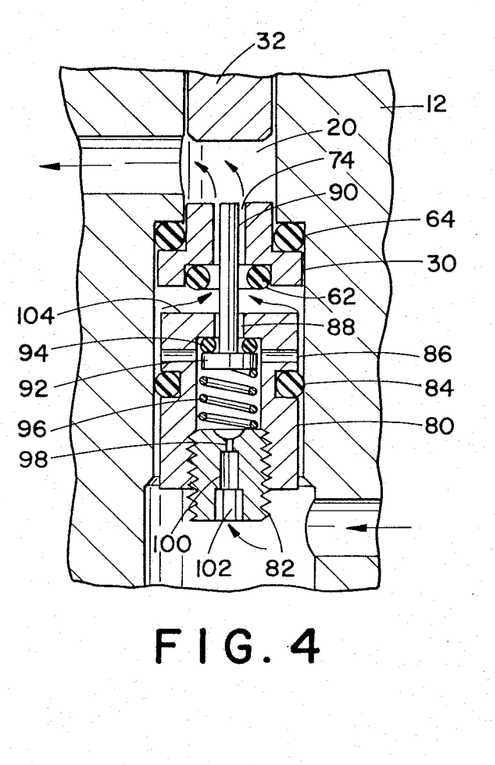
FIG. 4 is an enlarged sectional view of a portion of an alternative embodiment of a flow limit valve and is shown in an open, or flowing, position.

Another embodiment of the present invention, shown in FIG. 4, utilizes a modified piston 80 to provide easier resetting. During the resetting of the flow limit valve 10, often the upstream supply pressure is quite high requiring a quite large force to move the piston 22 to the open position. To reduce the force required to reset the valve 10, this embodiment includes a movable piston pin 90 with an enlarged head 92 that is biased toward a pin seal 94 by a compression spring 96. This piston 80 operates identically to the previously-described piston 22 in the open and the closed positions and has an orifice screw 82, an orifice 98, an axial passage 100, a hex socket 102, a flow seal seat 104, and a piston seal 84 mounted in a groove 86, all of which function like their previously-described counterparts. When this piston 80 is reset, however, the pushrod head 32 contacts the movable piston pin 90 which compresses the spring 96 and allows pressurized fluid to flow through a pin passage 88 to relieve the back pressure before shifting the piston 80 to the open position.

Figure 5:
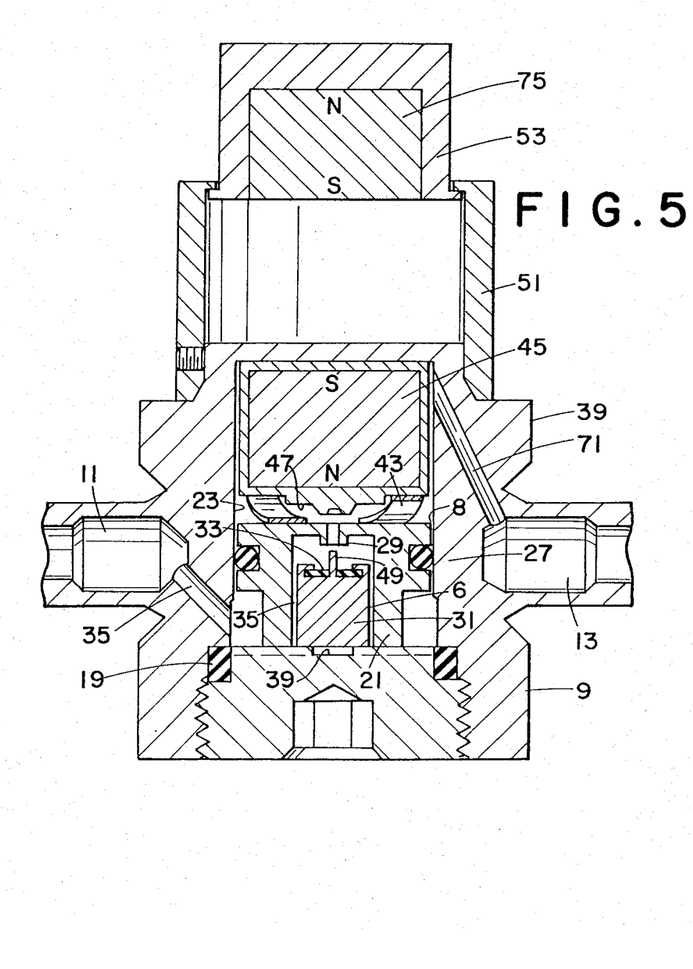
FIG. 5 is a sectional view of the valve according to another embodiment of the present invention.

Referring now to FIG. 5, there is shown a sectional view of a preferred embodiment having a hollow, generally cylindrical valve body 9 and having laterally-positioned inflow 11 and outflow passages 13. The lower end 15 of the valve body 9 is closed off by a plug 7 which is threaded or otherwise removably attached to the valve body 9. An elastomeric seal 19 is compressed between the plug 7 and valve body 9 to form a seal against fluids within the structure leaking into the environment. The plug 7 is of sufficient diameter to provide access, when removed, to the internal parts of the valve for assembly and repair.

The internal parts include the valve seat and piston guide housing 21 which is positioned within the internal bore 23 of the valve body 9 against a shoulder 8. A seal ring 27 is positioned between the valve body 9 and housing 21 to prevent fluid leaking past the valve seat 29 when it is closed off by the piston 31 and elastomeric seat 33. The piston 31 may have longitudinal grooves or flats 6 formed in its cylindrical surface to permit fluid to flow along and around it from the inflow passage 11 and connecting ducts 35 and 37.

Above, or "downstream" of, the piston 31 and valve seat 29 is an upper chamber 39 that is connected to the outflow passage 13 via duct 71. A flat spring 43 is located within the upper chamber between the top of the housing 21 and the base of a magnet 45 which may be encapsulated within a stainless steel housing or casing or encapsulated in fluid-impervious material such as polypropylene or polytetrafluoroethylene ("TEFLON" material available from DuPont Co.). The encapsulated magnet 45 is disposed to slide within the upper chamber so that its lower face 47 contacts pin 49 that is carried by the piston 31 to protrude through the valve seat 29 for resetting purposes, later described.

An upper housing 51 is suitably attached to the top of valve body 9 (e.g., by threaded attachment or by set screw 73, or the like) to confine the movement of another magnet 75 in a direction aligned with the magnet 45 inside the valve body. Both magnets are oriented for magnetic repulsion, and the upper magnet may be encased in bright-color anodized aluminum 53 to identify the protruding magnet as a button for resetting purposes, later described. The valve body 9 is preferably formed of nonmagnetic (or low-level magnetic) material such as brass, stainless steel, aluminum, plastic, or the like, to permit suitable interaction between magnets.

In operation, the valve of the present invention is oriented substantially vertically, as shown, and the flat spring 43 supports both magnet 45 and the repelled magnet 75. The piston 31 is normally down in the internal base of the housing 21, thus leaving the valve seat 29 and elastomeric seat 33 clear or open for fluid flow therethrough. Note that fluid entering the inflow passage 11 normally flows through ducts 35, 37 and 6, through the valve seat 29, 33 to the upper chamber and then via ducts 39, 71 to the outflow passage 13. The weight of piston 31 and the cross section of the longitudinal grooves or flats 6 in the walls of piston 31 determine, for a certain density of fluid, the limit of fluid flow rate past the piston 31 before the piston is moved up to close off the flow at valve seat 29 and elastomeric seat 33. The piston 31 in the illustrated embodiment thus operates both as the metering device and as the shut-off device. A substantial pressure differential can exist across the valve seat 29, 33 to maintain the piston in sealing position against the valve seat. Thus, flow of a fluid in excess of a selected amount moves the piston 31 to shut off the flow. Pistons of different weight and different-size passages 6 may be inserted into the housing 21, following removal of plug 7, to establish different upper limits of fluid flow at which the piston 31 moves to seal off the flow. A range of maximum values of fluid flow can readily be determined simply by changing pistons 31 (i.e., with different weights and grooves) to cover fractional liters per minute up to hundreds of liters per minute, at selected static pressure, for most applications in which noxious fluids must be controlled.

If excess flow of fluid occurs and the piston 31 moves up to seal off further flow, the valve will not reset itself as long as static pressure is maintained at the inflow side of the valve. Therefore, the valve must be reset to position the piston 31 away from the valve seat 29. This is accomplished from the environment without sliding seals or bellows, or the like, by action of pin 49 that protrudes loosely through the aperture in the valve seat 29 for mating engagement with face 47 on magnet 45. Thus, the upper magnet 75 is depressed to decrease the spacing between magnets and thereby to increase the repulsion force imparted by spring 43 on magnet 45, the face 47 engages pin 49 and moves it and piston 31 downwardly away from the valve seat 29 to restore fluid flow again. The surface area of valve seat 29 may be selected in inverse relationship to the operating fluid pressure to provide valves for operation in pressure ranges from about 1-3000 pounds per square inch.

Figure 6:
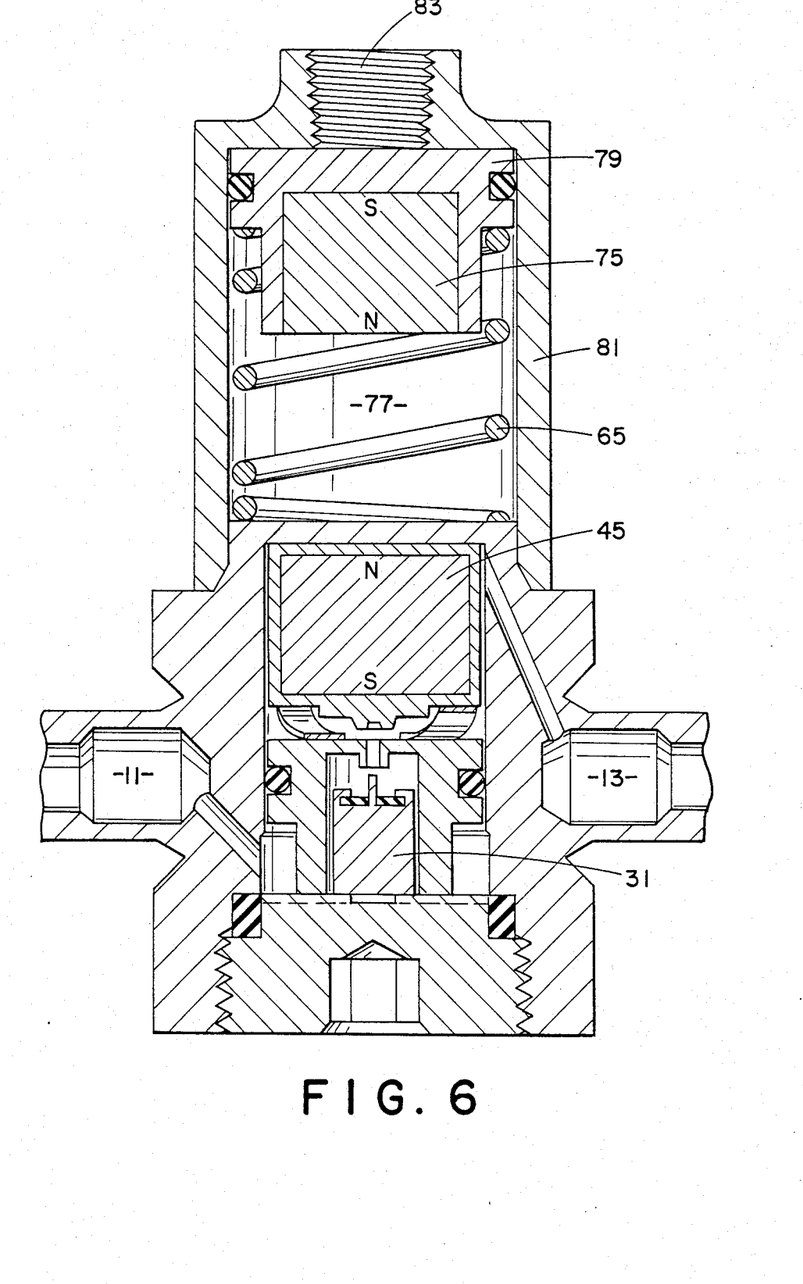
FIG. 6 is a sectional view of another embodiment of the valve of FIG. 5.

In accordance with another embodiment of the present invention, as illustrated in FIG. 6, the resetting operation of the basic valve assembly is remotely controlled by an actuator 77 which includes the upper magnet 75 contained within a pneumatic (or electromagnetic) structure. In this embodiment, the upper magnet 75 is included within a piston 79 which is slidably mounted within the housing 81 that has a fluid port 83 formed at the upper end. Thus, by applying fluid under pressure to the port 83, the piston 79 moves magnet 75 closer to magnet 45 and thus resets the piston 31 in the manner as previously described. The spring 65 returns the upper magnet 75 to the topmost position after fluid pressure is reduced at port 83. Of course, the actuator 77 may also be electromagnetic in nature simply by forming a solenoid in cylindrical alignment with magnet 75 so that, upon application thereto of electrical current, the resulting magnetic field will interact with magnet 75 in known manner to move it closer to magnet 45 for reset operation in the manner as previously described.

Figure 7:
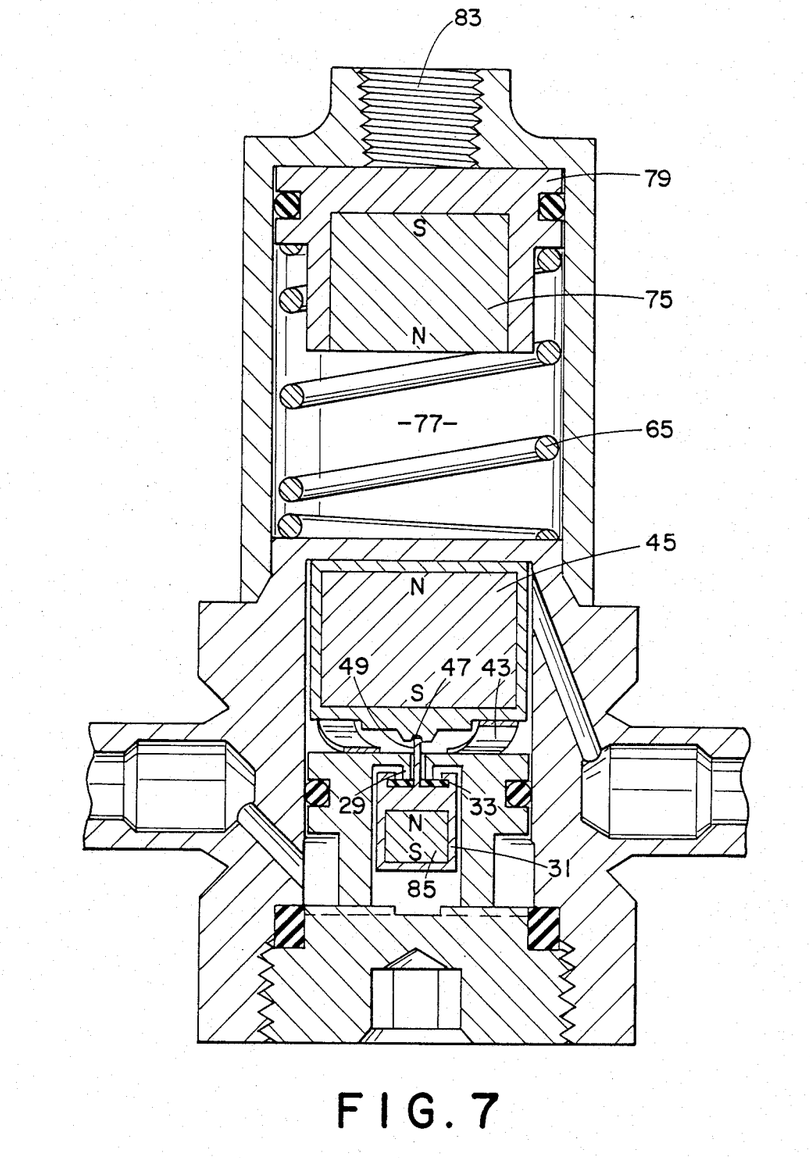
FIG. 7 is a sectional view of another embodiment of the valve in FIG. 5.

Referring now to FIG. 7, there is shown a sectional view of another embodiment of the basic valve structure of FIGS. 5 and 6 in which the flow-controlling piston 31 includes a magnet 85 that is oriented in magnetic attraction with the magnet 45. Thus, the piston 31 and elastomeric seal 33 normally form a seal with valve seat 29 against flow of fluid therethrough. The flat spring 43 supports magnet 45 and attracted magnet 85, and piston 31 in the normally closed position, and the actuator 77 is used to open (rather than merely reset) the valve. The actuator with piston 79 containing the magnet 75 may again be moved into close repulsion relationship with magnet 45 in response to fluid pressure applied to port 83 (or to electric current applied to a solenoid), as previously described to urge the face 47 of magnet 45 into engagement with pin 49, thereby to open the valve for fluid flow between valve seal 29 and elastomeric seal 33. When controlling fluid pressure is removed form port 83 (or electric current is removed from a solenoid), the flat spring 43 again lifts the magnet 45 and the attracted magnet 85 and piston 31 into sealing engagement against valve seat 29.

The inflow and outflow passages 11, 13 in each embodiment may be welded to the valve body 9, and the entire structure may be contained within 1¼" diameter and 2½" height for compact, reliable operation. Purging of the structure to remove residual fluid is simplified in the latter-described embodiment by the reduced size and small internal volume, and by the substantially smooth flow-through design of the internal fluid passage which eliminates the need for multiple passageways, as previously described.

Figure 8:
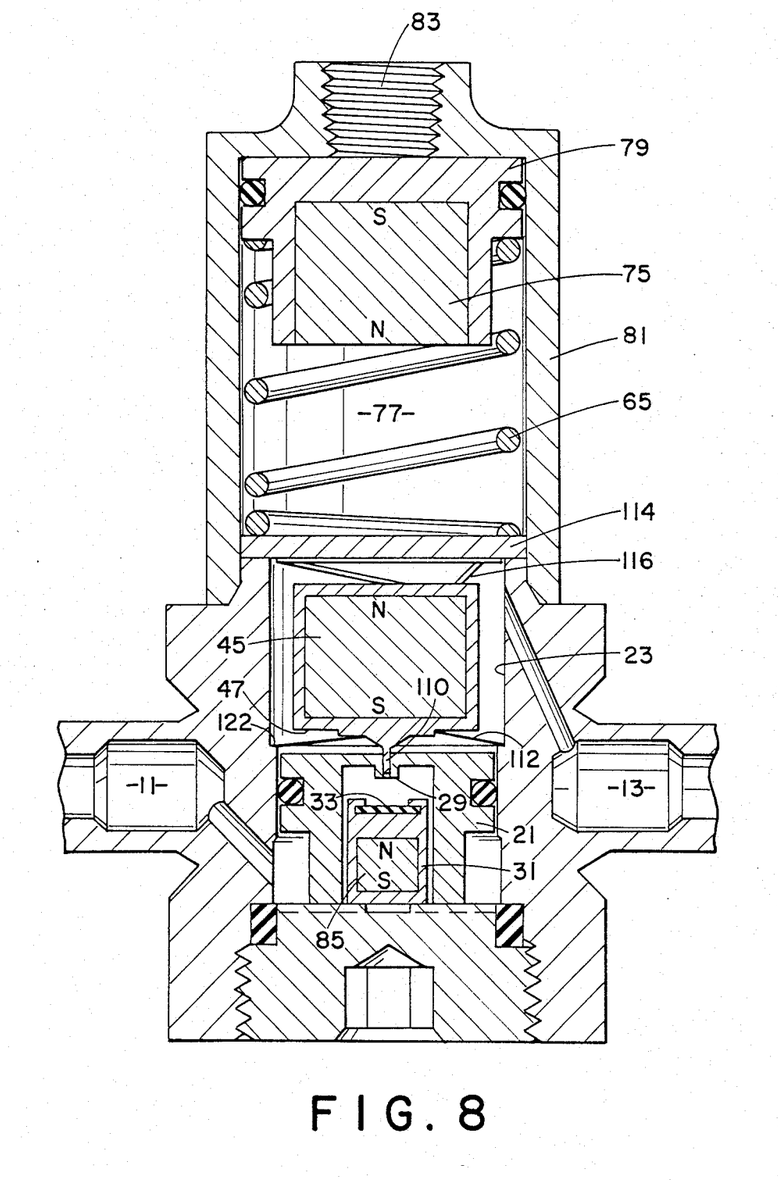
FIG. 8 is a sectional view of yet another embodiment of the valve according to the subject invention; and, FIG. 9 is a plan view of one of the springs used in the alternative embodiment of FIG. 8.

Turning now to the alternative embodiment of FIGS. 8 and 9, the flow limit valve shown therein is arranged to eliminate sliding contact between the exterior of encapsulated magnet 45 and the walls of bore 23. This has the advantage of reducing the possibility of wear particles entering the system. In addition, the actuating pin is shifted from the flow controlling piston 31 to the encapsulated magnet 45. Specifically, as shown, the flow controlling piston 31 still includes the magnet 85 but the pin has been removed therefrom. Instead, a pin 110 extends from the lower face 47 of the encapsulated magnet 45. The pin normally protrudes into the valve seat and, upon vertical downward movement of the encapsulated magnet through actuation of the upper magnet 75, extends completely through the valve seat to unseat the elastomeric seal 33 of the piston from the valve seat 29.

The encapsulated magnet 45 is normally biased away from the piston guide housing 21 by a first biasing means such as spring 112. Likewise, the encapsulated magnet is biased away from closure member 114 of the second cavity by a second biasing means such as spring 116. The opposed forces of springs 112, 116 position the encapsulated magnet in a floating relationship in the second chamber and maintain its exterior surfaces out of sliding contact with the exterior walls of the chamber.

The first spring 112 is received on a radially extending shoulder 122 formed in bore 23. With additional reference to FIG. 9, the first spring is shown in greater detail. An outer peripheral portion 124 of the spring is dimensioned for receipt on the shoulder 122 while an inner, generally circular region 126 is preferably spot welded to the lower face of encapsulated magnet 45. Plural arms 128 interconnect the vertically offset outer portion 124 and inner region 126.

The second spring 116 is similar to that shown in FIG. 9 so that like terms will describe like parts. The spring 116, specifically its outer portion, is preferably received between the closure member and valve body. The closure member is welded to the valve body to seal the upper second chamber and thus, the spring 116 is secured to the valve body along the welded joint. The inner region of spring 116 is also normally spot welded to an upper surface of the encapsulated magnet.

The valve structure of the present invention contains noxious fluids within a sealed structure that does not rely upon sliding seals or flexible members to provide controlling motions applied from the environment. In addition, the entire structure can be assembled and serviced through a sealable port so that, once assembled, the maximum flow setting at which automatic shut-off occurs in one embodiment cannot be tampered with. Also, simple modifications enable the basic valve structure to be operated in different manners consistent with requirements for remote control of on-off operation or of reset function of automatic shut-off operation.

Having thus described the invention, what is claimed is:

1. An apparatus for inhibiting the excess flow of fluid under pressure therethrough and for manually restoring flow controlling operation thereof without fluid seals on flexible members interposed between fluid under pressure therewith and the environment, the apparatus comprising:

a body having an aperture between a vertically-aligned lower first chamber and upper second chamber for fluid flow therethrough from the first chamber to the second chamber, said aperture having a sealing face on the side thereof within the first chamber;

a fluid inlet coupled to the first chamber at a location in the lower region thereof remote from the aperture, and a fluid outlet coupled to the second chamber;

an element vertically disposed and slidably positioned within the first chamber intermediate the fluid inlet and the aperture and freely slidable vertically therein for movement between a normally-open reset position away from engagement with the aperture and a sealing position in contact with the aperture to form a fluid-tight seal therewith without any intervening resilient means for urging the element away from the sealing position, said element providing fluid passages of selected cross-sectional area from the fluid inlet to the aperture for imparting self-actuated moving force to the element to move the element to the sealing position in contact with the aperture in response to fluid under pressure flowing through said selected cross-sectional area momentarily in excess of a selected flow rate;

an actuator disposed for vertical movement through the aperture for selectively repositioning the element in the first chamber to its reset position therein from the second chamber;

control means including a magnet interposed between first and second biasing means for vertical sliding movement within the second chamber to selectively alter the position of the actuator, said first and second biasing means urging said control means away from the aperture to permit fluid under pressure at said fluid inlet to maintain said element in said sealing position closing said aperture following momentary excess rate of flow of the fluid under pressure; and, a magnet disposed outside the body to interact in direct alignment and in magnetic repulsion with the magnet of the control means for altering the position of the control means within the second chamber to apply force to the actuator.

2. The apparatus as defined in claim 1 wherein said actuator is carried on said element.

3. The apparatus as defined in claims 1 wherein said actuator is carried on said control means.

* * * * *